United States Patent [19]

MacKendrick

[11] Patent Number: 6,158,050
[45] Date of Patent: *Dec. 12, 2000

[54] SPACESUIT SIZING AND TENSION RELIEF BEARING

[75] Inventor: Robert R. MacKendrick, Milford, Conn.

[73] Assignee: Air-Lock, Incorporated, Milford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/211,401

[22] Filed: Dec. 15, 1998

Related U.S. Application Data

[60] Provisional application No. 60/069,821, Dec. 16, 1997.

[51] Int. Cl.[7] .............................. A62B 17/00; B64G 6/00
[52] U.S. Cl. ................................................. 2/2.12
[58] Field of Search ........................... 2/2.11, 2.12, 2.13; 285/298, 302

[56] References Cited

U.S. PATENT DOCUMENTS

| | | | |
|---|---|---|---|
| 3,507,523 | 4/1970 | Cadley . | |
| 3,636,564 | 1/1972 | Vykukal | 2/2.12 |
| 3,754,779 | 8/1973 | Peress | 285/11 |
| 4,151,612 | 5/1979 | Vykukal | 2/2.12 |
| 4,596,054 | 6/1986 | MacKendrick et al. | 2/2.12 |
| 4,598,427 | 7/1986 | Vykukal | 2/2.12 |
| 4,598,428 | 7/1986 | Vykukal | 2/2.12 |
| 5,068,919 | 12/1991 | MacKendrick et al. | 2/2.12 |

*Primary Examiner*—Michael A. Neas
*Attorney, Agent, or Firm*—Maurice M. Klee

[57] ABSTRACT

An assembly (100) for adjusting the size of a spacesuit and/or for relieving tension applied to the spacesuit is provided in which first and second members (102,104) slide relative to one another along a longitudinal axis (106) to vary the assembly's length. The members (102,104) define a first region (116) which is internal to both members and which changes in volume as the length of the assembly is varied and a second region (118) which is external to the first member (102) and internal to the second member (104) and which also changes in volume as the length of the assembly is varied. The first and second regions (116,118) are connected to one another by a gas conducting path (120). These regions (116,118) have sealed cross-sectional areas which are substantially equal to one another. In this way, pressurization of the spacesuit produces no net sliding motion of the first and second members (102,104) along the longitudinal axis (106). In addition, the members (102,104) can move relative to one another without changing the sealed internal volume of the spacesuit. Preferably, the first and second members (102,104) can rotate relative to one another about the longitudinal axis (106), whereby the assembly (100) can serve as a bearing for the spacesuit.

8 Claims, 5 Drawing Sheets

SPACESUIT SIZING AND TENSION RELIEF BEARING

CROSS REFERENCE TO RELATED PROVISIONAL APPLICATION

This application claims the benefit under 35 USC §119(e) of U.S. Provisional Application No. 60/069,821 filed Dec. 16, 1997, the content of which in its entirety is hereby incorporated by reference.

BACKGROUND OF THE INVENTION

1. Field of the Invention

This invention relates to spacesuits and in particular to apparatus which can be used to: (1) adjust the length of various portions of a spacesuit so that the spacesuit can fit a variety of users; (2) relieve loads applied to the spacesuit during use by an astronaut, i.e., relieve the forces on a spacesuit known as "manloads"; and (3) provide rotation of spacesuit components relative to one another, i.e., serve as a bearing.

2. Description of the Prior Art

FIG. 1 shows a representative spacesuit which includes helmet 10, rear entry panel 12, main body 14, shoulder portions 16, arm portions 18, gloves 20, hip portions 22, leg portions 24, and boots 26.

To accommodate users of different sizes, prior art spacesuits have employed various approaches for adjusting the size of the spacesuit to fit the user, e.g., to adjust the lengths of arm portions 18 and leg portions 24. Commonly-assigned U.S. Pat. No. 5,068,919, the contents of which are incorporated herein by reference, reviews these prior approaches, including the use of sewn-in fabric inserts in the arms and legs of the suit and the use of metal sizing rings held in place by Ortman wires.

U.S. Pat. No. 5,068,919 itself discloses an improvement over the Ortman approach in which the Ortman wires are replaced with threaded collars, a threaded metal sizing ring, and a redundant interlock system to prevent inadvertent disassembly of the components. The system of this patent has proved to be highly successful in practice.

Further improvements, however, are desired in a number of areas. First, none of the prior approaches to spacesuit sizing has provided automatic sizing during use. Rather, all of these approaches have required that sizing be performed before an astronaut suits up. Accordingly, two astronauts can rarely use the same spacesuit without first going through a sizing procedure on the suit.

Similarly, none of the prior spacesuit sizing approaches has provided relief for loads applied to the spacesuit during use. Such loading can, for example, occur when an astronaut spreads his or her arms to their full extent while performing maneuvers in space. This loading can be significant especially if the astronaut's personal preference is for a spacesuit which is rather tight fitting. As known in the art, an astronaut will experiment with a number of spacesuit components to find a spacesuit size which he or she finds suitable. This process can result in a suit which has a fingertip to fingertip length which is shorter than the astronaut's maximum extended arm length by, for example, one inch (2.54 cm). Accordingly, when an astronaut spreads his or her arms to their full extent significant loads (manloads) can be applied to the suit.

The prior approaches to spacesuit sizing have also employed components which were not free to rotate relative to one another during use. Accordingly, separate components have been required to provide bearing function at, for example, the shoulder, elbow, hip, and knee joints. This separation of sizing and bearing function has increased the cost and complexity of the spacesuit.

SUMMARY OF THE INVENTION

In view of the foregoing state of the art, it is an object of the present invention to provide improved spacesuit sizing apparatus. In particular, it is an object of the invention to provide apparatus which has a range of automatic sizing and automatic tension relief.

It is a further object of the invention to provide a spacesuit sizing/tension relief system which exhibits rotary motion, so that system can take the place of a bearing at a spacesuit joint.

It is an additional object of the invention to provide a spacesuit sizing/tension relief system which operates without varying the total sealed volume of the spacesuit.

It is another object of the invention to provide a spacesuit sizing/tension relief system which is both reliable and easy to use, i.e., a system which does not suffer from inadvertent disassembly problems.

It is also an object of the invention to provide a spacesuit sizing/tension relief system which does not employ removable parts which can be lost or misplaced during use.

To achieve the foregoing and other objects, the invention provides a spacesuit sizing/tension relief system which comprises an assembly having a longitudinal axis and a variable length along said longitudinal axis, said assembly comprising:

(a) first and second ends for connection to first and second components of a spacesuit, e.g., to arm portion 18 and glove 20 in FIG. 1;

(b) first and second members (tubes) which slide relative to one another along the longitudinal axis to vary the length of the assembly, said members defining a first region which is internal to both members and which changes in volume as the length of the assembly is varied and a second region which is external to the first member and internal to the second member and which changes in volume as the length of the assembly is varied, said first and second regions being connected to one another by a gas conducting path and having sealed cross-sectional areas in a direction orthogonal to the longitudinal axis which are substantially equal to one another such that pressurization of the first and second regions to the same pressure produces substantially no net sliding motion of the first and second members along the longitudinal axis;

(c) seal means between the first and second members to isolate the first and second regions from an environment outside of the spacesuit, said seal means maintaining said isolation as the first and second members slide relative to one another along the longitudinal axis; and (d) means for defining a maximum extent to which the first and second members can slide relative to one another along the longitudinal axis.

In the preferred embodiments of the invention, the first and second members can rotate relative to one another about the longitudinal axis so that the assembly operates as a bearing. For these embodiments, the seal means comprises rotatable seals which allow for low friction rotation while maintaining isolation of the first and second regions from the environment surrounding the spacesuit.

In other preferred embodiments, the assembly is biased towards its shortest length. This is especially important with regard to the tension relief aspects of the invention since such biasing will return the suit to its nominal size once the tension, e.g., a manload, is no longer being applied.

Such biasing can be accomplished by making the sealed cross-sectional area in a direction orthogonal to the longitudinal axis of the second region larger than that of the first region so that pressurization of the first and second regions to the same pressure produces a force which causes the members to move together, i.e., causes the members to move to the assembly's shortest length.

Alternatively and preferably, the biasing is accomplished by spring loading the first and second members towards their shortest length configuration. Such spring loading is preferred since biasing based on pressurization depends on the pressure differential between the inside and outside of the spacesuit and thus will be inoperative when the spacesuit is not pressurized, e.g., when it is being taken on or off. Also, an increase in the sealed cross-sectional area of the second region requires either an increase in the assembly's diameter or the use of multiple chambers to form the second region (see FIG. 5).

In addition, biasing based on pressurization means that a change in the length of the assembly will result in a change in the total sealed volume of the spacesuit. Such changes are undesirable since they can affect the operation of the systems used to control the internal environment of the suit.

The accompanying drawings, which are incorporated in and constitute part of the specification, illustrate representative embodiments of the invention, and together with the description, serve to explain the principles of the invention. It is to be understood, of course, that both the drawings and the description are explanatory only and are not restrictive of the invention.

DETAILED DESCRIPTION OF THE INVENTION

Figure 2:
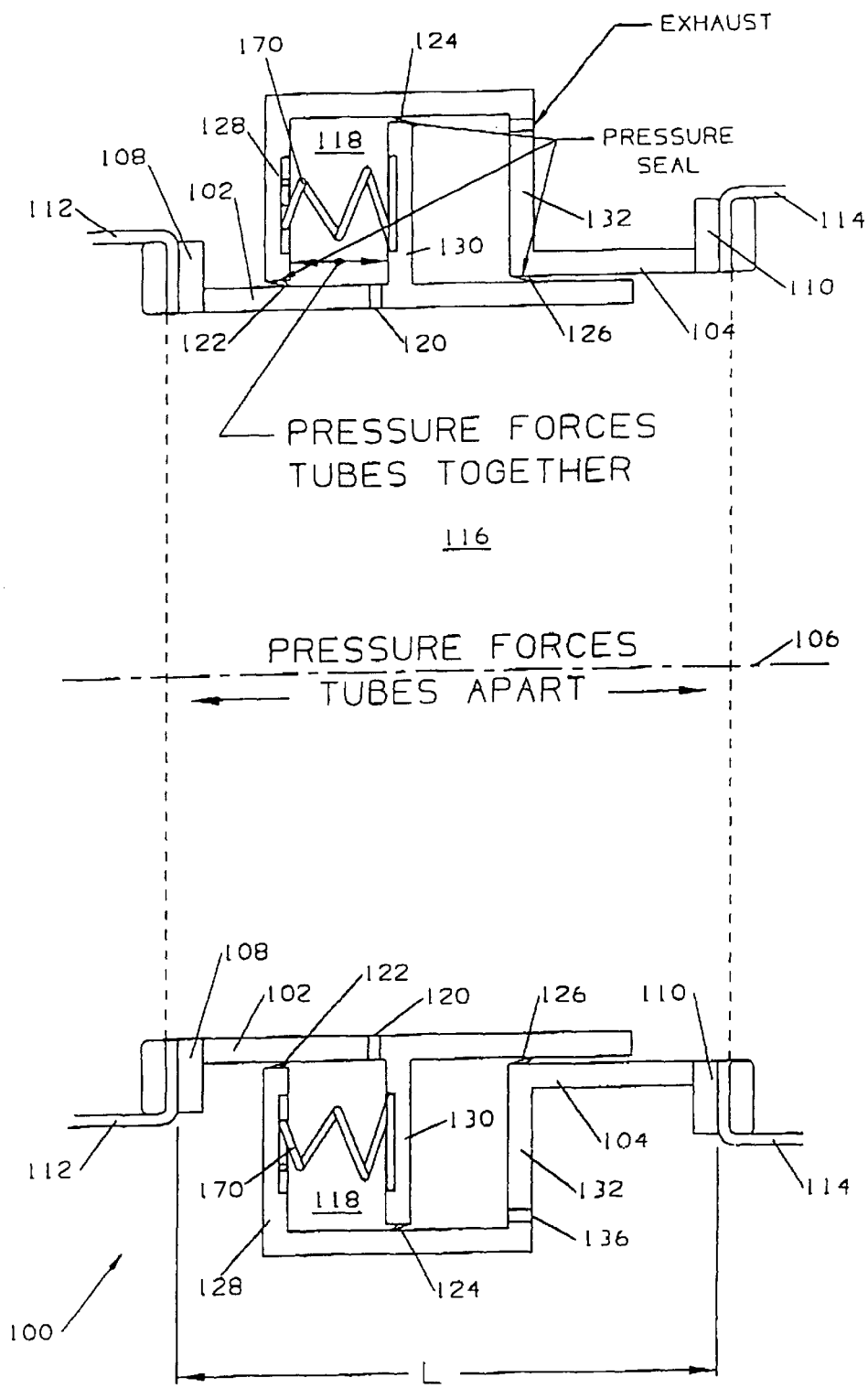
FIG. 2 is a schematic diagram illustrating the principles of the invention.

As discussed above, the present invention relates to a system which provides automatic spacesuit sizing and/or tension relief FIG. 2 illustrates the operating principles of the invention. As shown therein, the spacesuit sizing/tension relief system comprises an assembly 100 which is composed of first member 102 and second member 104 which can slide relative to one another along longitudinal axis 106 to change the length "L" of the assembly. Although the change in the length "L" can be as large or as small as desired, in general, the difference between the maximum and minimum values of "L" will be about 0.5 inches (1.27 cm). Preferably, members 102 and 104 have circular cross-sections in a direction orthogonal to axis 106 so that they can rotate about that axis and thus serve as a bearing of the spacesuit.

Figure 3:
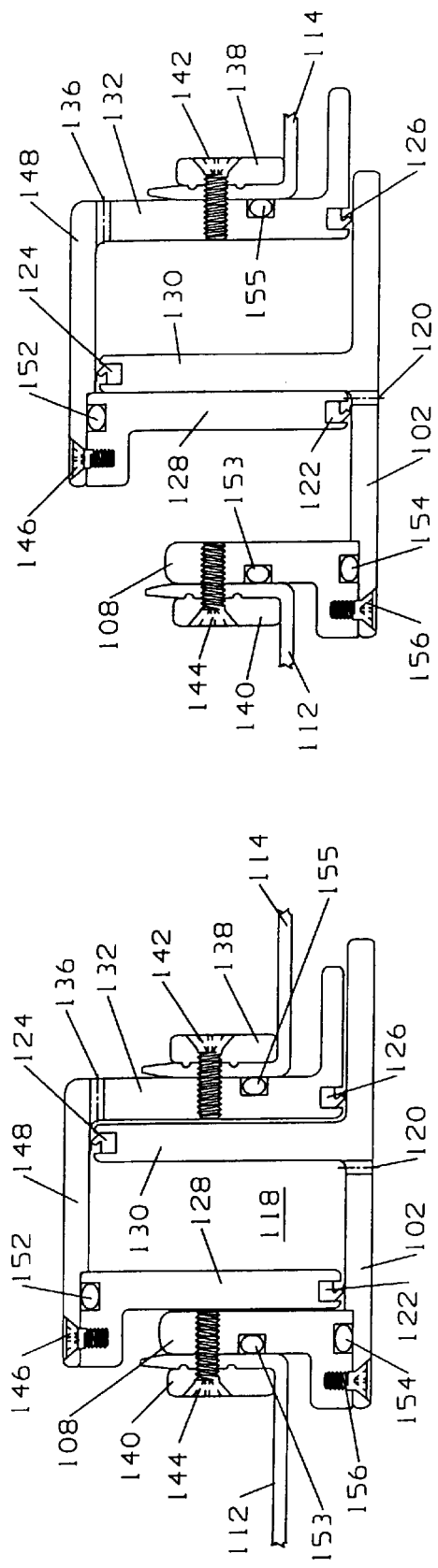
FIG. 3 is a cross-sectional view of a representative embodiment of the invention. The left hand panel of this figure shows the invention in its short length configuration, while the right hand panel shows it in its long length configuration.

Assembly 100 includes first end 108 and second end 110 for connection to first and second spacesuit components 112 and 114 by conventional means, e.g., by collars 138,140 and bolts 142,144 shown in FIG. 3. As shown in FIG. 2, second end 110 is spaced from annular rib 132. Second end 110 can be located at rib 132 as illustrated, for example, in FIG. 3. First and second spacesuit components 112 and 114 can be, for example, arm, leg, or waist components of the spacesuit.

First and second members 102,104 define first region 116 and second region 118 which are connected to one another by gas conducting path 120. As shown in FIG. 2, gas conducting path 120 comprises two apertures in first member 102. If desired, more or less apertures can be used as the gas conducting path.

Second region 118 is sealed from the environment surrounding the spacesuit, e.g., the vacuum of outer space, by slidable seals 122 and 124. A third slidable seal 126 is used at the remaining interface between first member 102 and second member 104. Exhaust 136 allows members 102 and 104 to slide relative to each other without creating pressure forces within the otherwise closed volume formed by ribs 130,132 and seals 124,126.

Seals 122,124,126 are preferably lip seals of the type disclosed in commonly assigned U.S. Pat. No. 4,596,054, the relevant portions of which are incorporated herein by reference. Such lip seals are especially preferred when the assembly serves as a bearing of the spacesuit.

Seal 126 defines the sealed cross-sectional area of first region 116. The sealed cross-sectional area is that area of the assembly where sliding motion between the first and second members takes place while maintaining a seal between the first region and the environment surrounding the spacesuit. If seal 126 has a radius $R_{126}$, then the sealed cross-sectional area of first region 116 is: $A_{116}=\pi(R_{126})^2$.

Seals 122 and 124 define the sealed cross-sectional area of second region 118. In this case, the sealed cross-sectional area is that area of the assembly where sliding motion between the first and second members takes place while maintaining a seal between the second region and the environment surrounding the spacesuit. If seal 122 has a radius $R_{122}$ and if seal 124 has a radius $R_{124}$, then the sealed cross-sectional area of second region 118 is: $A_{118}=\pi(R_{124})^2-\pi(R_{122})^2$.

As discussed above, in the preferred embodiments of the invention the sealed cross-sectional area of second region 118 is substantially equal to the sealed cross-sectional area of first region 116 so that pressurization of the first and second regions to the same pressure produces substantially no net sliding motion of the first and second members along the longitudinal axis.

For these embodiments, the assembly preferably includes spring means to bias the assembly to its shortest length configuration. Such spring-based biasing can, for example, be located between ribs 128,130 (see element 170 in FIG. 2), or between ribs 130,132, or between first end 108 and rib 128, with the spring or springs becoming compressed as the length of the assembly increases in the first two cases and becoming extended in the last case. Combinations of springs at these various locations, as well as at other locations, e.g., within first region 116, can be used in the practice of the invention.

It should be noted that ribs 128 and 132 are part of second member 104 whereby second region 118 is internal to that member. Similarly, rib 130 is part of first member 102. Although rib 130 defines one side of second region 118, that region is not internal to first member 102.

For the embodiment illustrated in FIG. 2, the no-net-force condition exists when:

$$\pi(R_{126})^2 = \pi(R_{124})^2 - \pi(R_{122})^2.$$

Figure 5:
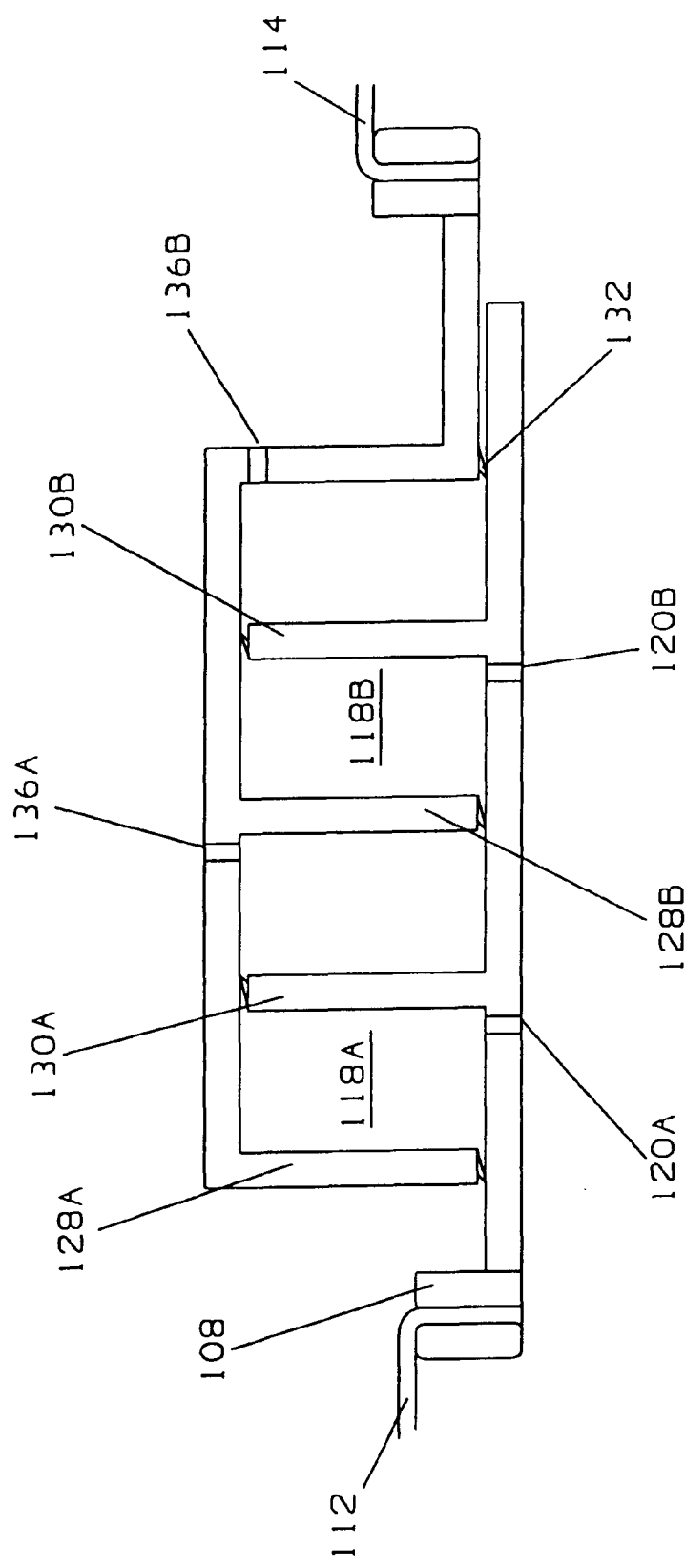
FIG. 5 shows an alternate configuration for the invention's second region.

Since $R_{126}$ and $R_{122}$ are the same, this means that $R_{124}$ must be equal to $\sqrt{2}$ times $R_{122}$, i.e., $R_{124}$ must be approximately 40% greater than $R_{122}$. Such a diameter increase is acceptable at most locations where size adjustment and/or tension relief is needed on a spacesuit. However, if a smaller diameter increase is desired, it can be achieved by subdividing second region 118 into multiple sub-regions as illustrated in FIG. 5. This figure illustrates the case where the second region has been divided into two sub-regions 118A, 118B, through the use of double rib sets 128A,128B and 130A,130B, double gas passages 120A,120B, and double exhausts 136A,136B. The outer diameter of the second region now only needs to be $\sqrt{1.5}$ times the inner diameter of that region to achieve a no-net-force condition, i.e., the outer diameter of this region only needs to be about 22% greater than the inner diameter. Further decreases in diameter can be achieved by using additional sub-regions if desired.

Rather than achieving a no-net-force condition, the sealed cross-sectional area of the second region 118 can be made greater than the sealed cross-sectional area of the first region 116 so as to produce a net force which biases assembly 100 to its minimum length condition. The magnitude of this biasing force will be equal to the difference between the sealed cross-sectional areas of the first and second regions times the pressure difference between the inside of the spacesuit and the environment surrounding the spacesuit. Typically, this area difference will be chosen to be just large enough to overcome the inherent friction of the assembly so that assembly's resting configuration is at its short length.

When used in space, the pressure difference between the inside of the spacesuit and the outside environment is typically approximately 4 psi. However, when an astronaut is putting on or taking off a spacesuit inside a spacecraft or on earth, the pressure difference is zero. Accordingly, as discussed above, spring biasing is preferred.

Ribs 128,130, in addition to defining second region 118, also prevent members 102 and 104 from sliding apart along longitudinal axis 106. That is, the engagement of these ribs define the assembly's long length configuration. The assembly's short length configuration can be defined by the engagement of ribs 130 and 132, and/or by the engagement of rib 128 with first end 108. Other structures can, of course, be used to define the short and long configurations of the assembly.

FIG. 3 illustrates suitable components for constructing the system of FIG. 2. In particular, as shown in this figure, rib 128 is a separate element which is attached to cross-member 148 by bolts 146. The figure also illustrates the use of bolts 156 to attach first end 108 to member 102, and the use of O-rings 152,153,154,155 to form seals between the various elements of the system. Typically, the rigid components of assembly 100 will be composed of metal, e.g., an aluminum alloy. These components can be coated with a low friction material, e.g., they can be TEFLON coated, at places where they might bind during use.

Figure 1:
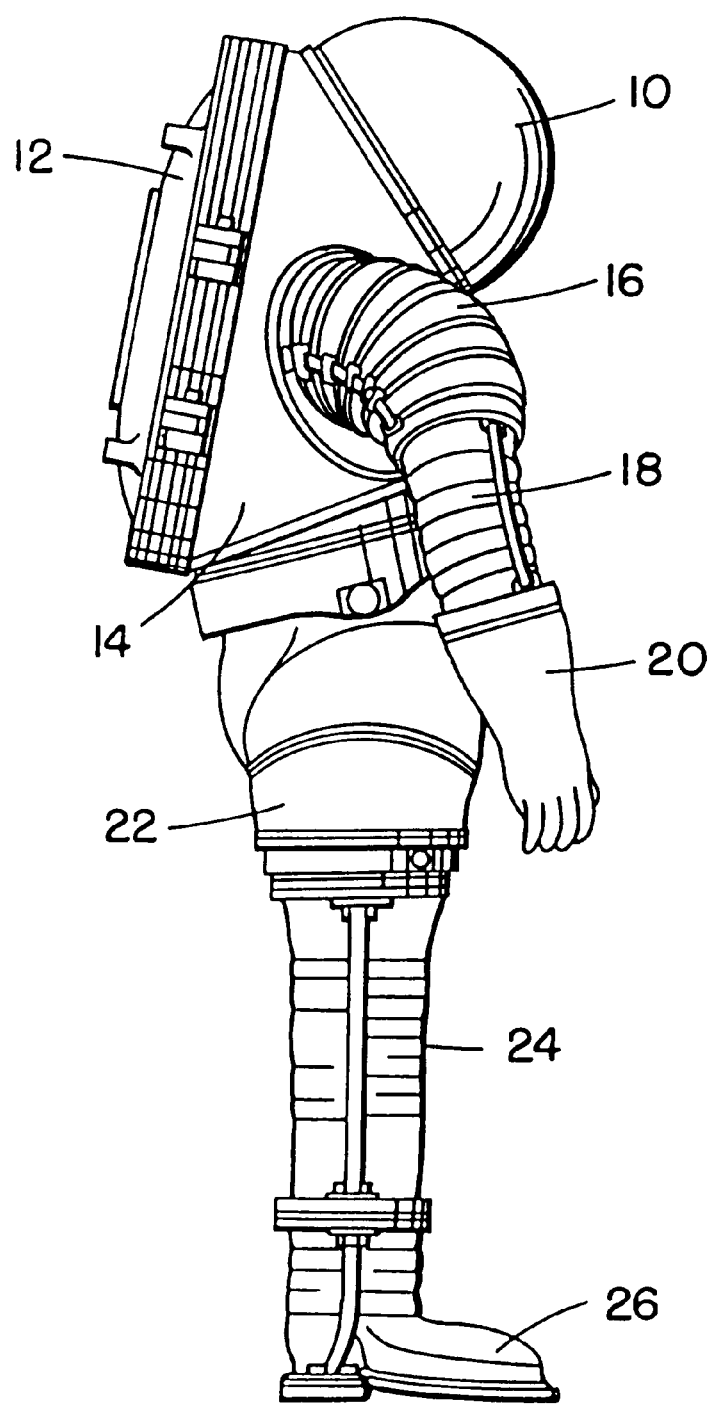
FIG. 1 is a side view of a representative spacesuit.
Figure 4:
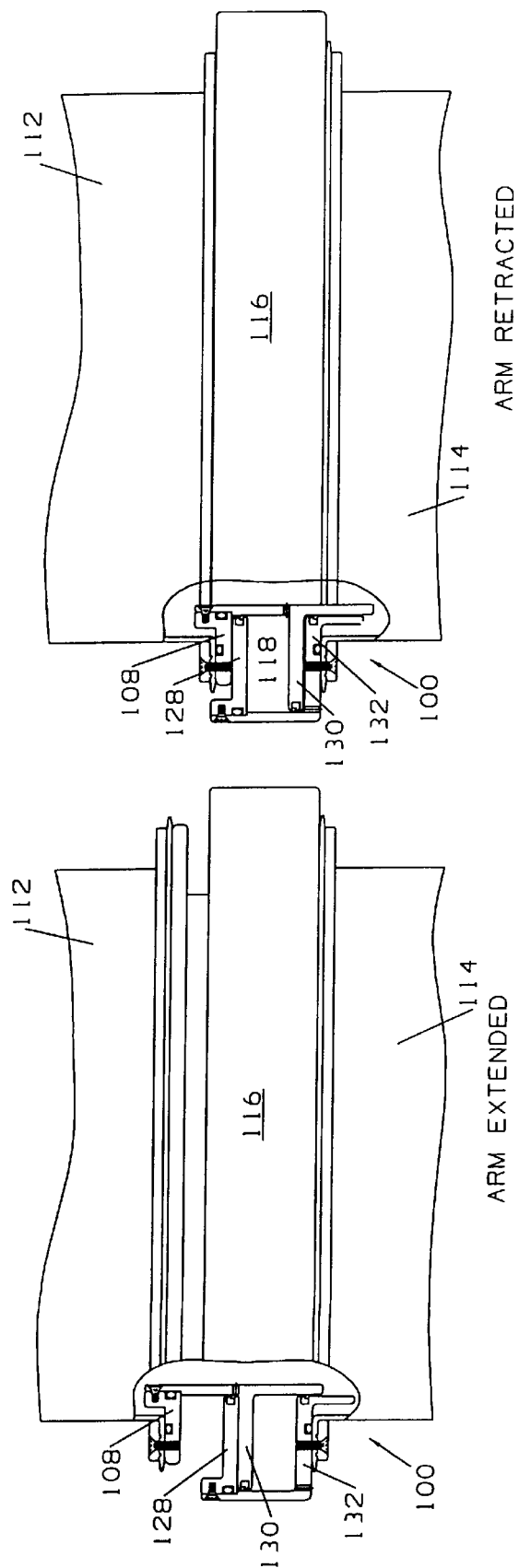
FIG. 4 is a side view, partially in section, showing the invention when installed in the arm of a spacesuit. The left hand panel in this figure shows the long length configuration, and the right hand panel shows the short length configuration.

Among other places, the sizing/tension relief system of the invention can be used at the interfaces between 1) shoulder portion 16 and arm portion 18, 2) arm portion 18 and glove 20, 3) hip portion 22 and leg portion 24, and 4) leg portion 24 and boot 26 (see FIG. 1). FIG. 4 illustrates the use of the system as part of the arm of a spacesuit, which is an especially preferred location when manload relief is desired.

The system can be attached to spacesuit fabric on both ends or can be attached to non-fabric components of the spacesuit on either or both ends. Also, rather than being a separate component, the sizing/tension relief system of the invention can be formed as part of a non-fabric spacesuit component.

A variety of modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. Apparatus for adjusting the size of a spacesuit comprising an assembly having a longitudinal axis and a variable length along said longitudinal axis, said assembly comprising:
    (a) first and second ends configured for connection to first and second components of the spacesuit;
    (b) first and second members which slide relative to one another along the longitudinal axis to vary the length of the assembly, said members defining a first region which is internal to both members and which changes in volume as the length of the assembly is varied and a second region which is external to the first member and internal to the second member and which changes in volume as the length of the assembly is varied, said first and second regions being connected to one another by a gas conducting path and having sealed cross-sectional areas in a direction orthogonal to the longitudinal axis which are substantially equal to one another such that pressurization of the first and second regions to the same pressure produces substantially no net sliding motion of the first and second members along the longitudinal axis;
    (c) seal means between the first and second members to isolate the first and second regions from an environment outside of the spacesuit, said seal means maintaining said isolation as the first and second members slide relative to one another along the longitudinal axis; and
    (d) means for defining a maximum extent to which the first and second members can slide relative to one another along the longitudinal axis.

2. The apparatus of claim 1 wherein the first and second members can rotate relative to one another about the longitudinal axis.

3. The apparatus of claim 1 wherein the assembly has a maximum and a minimum length along the longitudinal axis and the apparatus further comprises means for biasing the assembly towards its minimum length.

4. The apparatus of claim 1 wherein the second region comprises a plurality of sub-regions.

5. The apparatus of claim 1 wherein the apparatus provides tension relief for the spacesuit.

6. Apparatus for adjusting the size of a spacesuit comprising an assembly having a longitudinal axis and a variable length along said longitudinal axis, said assembly comprising:
    (a) first and second ends configured for connection to first and second components of the spacesuit;
    (b) first and second members which slide relative to one another along the longitudinal axis to vary the length of the assembly, said members defining a first region which is internal to both members and which changes in volume as the length of the assembly is varied and a second region which is external to the first member and internal to the second member and which changes in volume as the length of the assembly is varied, said first and second regions being connected to one another by a gas conducting path, said first region having a first sealed cross-sectional area in a direction orthogonal to the longitudinal axis and said second region having a second sealed cross-sectional area in a direction orthogonal to the longitudinal axis, said second sealed cross-sectional area being greater than said first sealed cross-sectional area such that pressurization of the first and second regions to the same pressure produces a net sliding motion of the first and second members along the longitudinal axis to reduce the length of the assembly;

(c) seal means between the first and second members to isolate the first and second regions from an environment outside of the spacesuit, said seal means maintaining said isolation as the first and second members slide relative to one another along the longitudinal axis; and (d) means for defining a maximum extent to which the first and second members can slide relative to one another along the longitudinal axis.

7. The apparatus of claim 6 wherein the first and second members can rotate relative to one another about the longitudinal axis.

8. The apparatus of claim 6 wherein the second region comprises a plurality of sub-regions.

* * * * *